(12) United States Patent
Yasui

(10) Patent No.: US 9,086,801 B2
(45) Date of Patent: Jul. 21, 2015

(54) TOUCH INPUT BASED ADJUSTMENT OF AUDIO DEVICE SETTINGS

(75) Inventor: Nozomu Yasui, Taipei (TW)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 856 days.

(21) Appl. No.: 13/384,750

(22) PCT Filed: Dec. 14, 2009

(86) PCT No.: PCT/US2009/067893
§ 371 (c)(1),
(2), (4) Date: Jan. 18, 2012

(87) PCT Pub. No.: WO2011/075114
PCT Pub. Date: Jun. 23, 2011

(65) Prior Publication Data
US 2012/0140955 A1   Jun. 7, 2012

(51) Int. Cl.
*G06F 3/041* (2006.01)
*G06F 3/0488* (2013.01)
*G06F 1/16* (2006.01)

(52) U.S. Cl.
CPC .......... *G06F 3/04883* (2013.01); *G06F 1/1688* (2013.01); *G06F 2203/04808* (2013.01)

(58) Field of Classification Search
CPC ..... G06F 3/041; G06F 3/0412; G06F 3/0416; G06F 3/0484; G06F 3/0488
See application file for complete search history.

(56) References Cited

U.S. PATENT DOCUMENTS

| | | | |
|---|---|---|---|
| 6,965,676 B1 * | 11/2005 | Allred | 381/104 |
| 2001/0043199 A1 | 11/2001 | Eastty | |
| 2009/0174675 A1 * | 7/2009 | Gillespie et al. | 345/173 |
| 2009/0177966 A1 | 7/2009 | Chaudhri | |
| 2009/0301795 A1 | 12/2009 | Ko | |

FOREIGN PATENT DOCUMENTS

KR   10-2006-0114167   6/2006

OTHER PUBLICATIONS

International Search Report and Written Opinion, date Sep. 15, 2010, 9 pages.

* cited by examiner

*Primary Examiner* — Regina Liang
(74) *Attorney, Agent, or Firm* — Hewlett-Packard Patent Department

(57) ABSTRACT

A computing device comprising a touch input device and a processor. The touch input device is configured to detect multiple touch point contacts. The processor is coupled to the touch device and configured to execute software instructions that process the multiple touch point contacts and, based on the multiple touch point contacts, adjust at least one audio setting of a plurality of audio output devices.

20 Claims, 4 Drawing Sheets

TOUCH INPUT BASED ADJUSTMENT OF AUDIO DEVICE SETTINGS

BACKGROUND

Computing devices such as laptops commonly include audio output devices such as speakers for outputting music or other audio content. It is desirable to provide a user the capability of adjusting settings of the audio devices.

BRIEF DESCRIPTION OF THE DRAWINGS

For a detailed description of exemplary embodiment of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Additionally, the term "system" refers to a collection of two or more hardware and/or software components, and may be used to refer to an electronic device, such as a computer, a portion of a computer, a combination of computers, etc. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
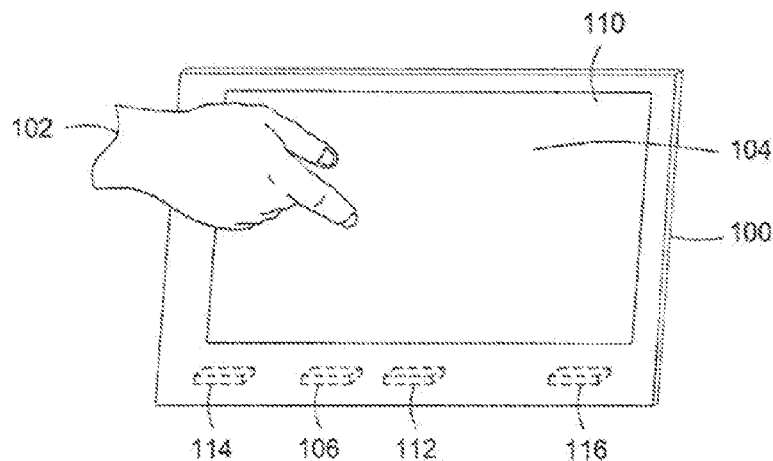
FIG. 1 shows a system that includes touch input based adjustment of audio device settings, constructed in accordance with at least some illustrative embodiments.

Embodiments of the present disclosure include novel touch input based adjustment of audio device settings for a computing device. FIG. 1 shows a system 100 that includes touch input based adjustment of audio device settings applicable to a variety of applications in accordance with various embodiments. The system 100 is a computing device comprising touch input device 104 (also referred to as touch-sensitive device) configured to detect multiple touch point contacts. A user 102 is shown making touch based contact with input device 104 to provide input to system 100. In one embodiment, multiple touch point contacts may comprise a first touch contact that includes continuous movement from a beginning touch point to an ending touch point and, simultaneously with the first touch contact, a second touch contact that includes continuous movement from another beginning touch point to another ending touch point. A visual display device 110 provides output video information in the form of a visual display for the user. In some embodiments, visual display 110 in combination with touch input device 104 can provide a user with the capability of inputting information to system 100. The touch input device 104 is coupled to processor 106 which is configured to execute software instructions in memory 112 that process the multiple touch point contacts and, based on the multiple touch point contacts, adjust at least one audio setting of a plurality of audio output devices 114, 116. In some embodiments, adjustment of an audio setting can include an adjustment of a sound frequency of an audio signal of an audio device, adjustment of a volume level of audio devices, and volume balance level of audio devices.

Figure 2:
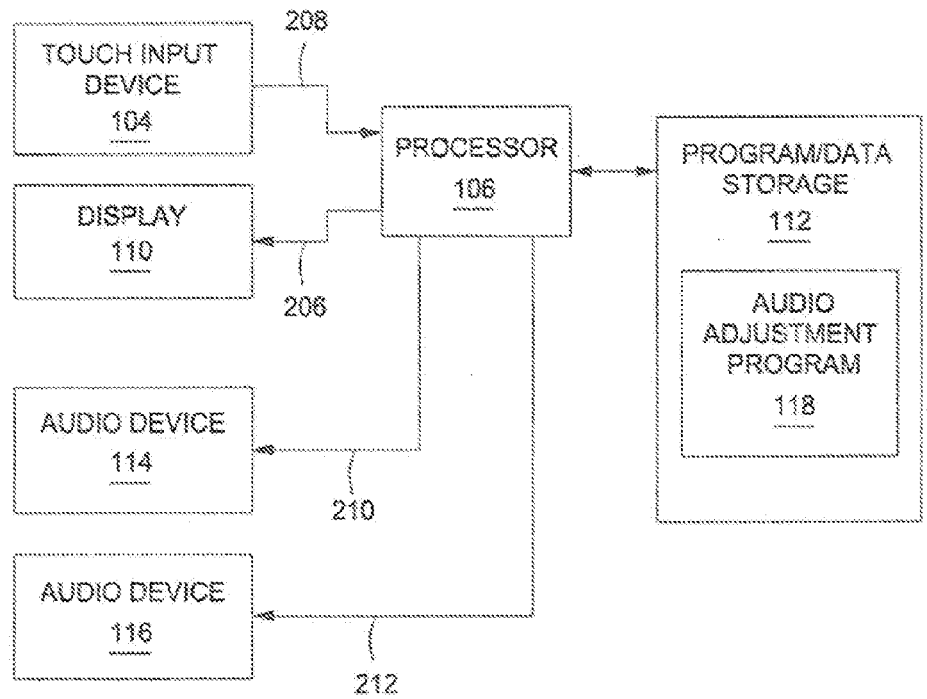
FIG. 2 shows a block diagram of the system of FIG. 1 that includes touch input adjustment of audio device settings, constructed in accordance with at least some illustrative embodiments.

FIG. 2 shows a block diagram of the system of FIG. 1 that includes touch input based adjustment of audio device setting, constructed in accordance with at least some illustrative embodiments. As explained above, system 100 comprises visual display 110, touch input device 104, processor 106, data/program storage 112 and audio devices 114, 116. Some embodiments of the system 100 can include other input devices, such as a keyboard, a mouse, etc. Embodiments can also include various input/output sub-systems to implement, for example, wired and/or wireless networking. In FIG. 1, the system 100 is depicted as a touch screen based computer, however in practice the system 100 can be any of a variety of electronic devices. For example, the system 100 can be a touch screen or touch based notebook computer, touch screen or touch-based telephone, personal digital assistant, music player, desktop computer, satellite navigation system, gaming system or other device that provides touch input capability. The system 100 shows a computing device having a single display housing member to house all of the components of the system. In another embodiment, system 100 can comprise a base member rotatably coupled to display member. The base member includes a housing to house processor 106, program/data storage 112 and audio devices 114, 116 and the display member houses display 110 and touch input device 104. In another embodiment, system 100 can comprise a base member supporting a keyboard and touch sensitive device such as a touch pad, and a display member supporting a touch input device such as a touch screen, or any combination thereof.

In one embodiment, processor sends signals 210, 212 to audio devices 114, 116, respectively, to control the audio output of the devices. FIGS. 1 and 2 show, in one embodiment, a pair of audio devices 114, 116 with system 100. In other embodiments, a greater or lesser number of audio devices can be employed with system 100. FIGS. 1 and 2, in some embodiments, show audio devices 114, 116 integrated with the system. In other embodiments, audio devices are separate from and external to the system. For example, in some embodiments, audio devices 114, 116 can be electrically coupled to the system via wired or wireless technologies. In other embodiments, audio devices 114, 116 can comprise an audio-subsystem that includes amplifiers, filter and other circuitry to drive the audio devices. In other embodiments, audio devices 114, 116 are configured as a stereo system such that device 114 is configured as a left channel speaker and device 116 is configured as a right channel speaker.

The processor 106 generates signals 206 to visual display 110 to provide video information to a user of the system 100. Visual display 110 can be; for example, a liquid crystal display ("LCD"), an organic light emitting diode ("OLED") display, or any other display technology useable with touch based input technology.

The touch input device 104 provides operator inputs to system 100 by detecting operator contacts with the device 104 and generating electrical signals 208 representative of the detected contacts. In FIG. 1, user 102 is shown making touch based contact with input device 104 to provide input to system 100. The input device 104 can be implemented in any of a variety of technologies, for example, a resistive, capacitive, surface acoustic wave, infra-red, or optical system can overlay the visual display 110. In some embodiments, a video system can be used to detect touch input contacts. Embodiments of the system 100 encompass all input devices that detect user contact and convert detected contact to electrical signals.

The processor 106 can be a general purpose microprocessor, microcontroller, digital signal processor, etc. configured to execute software programs. The components of a processor are well known in that art and generally include execution units (e.g., integer, fixed point, floating point, etc.), instruction decoding, registers, memories, input/output ports, etc, interconnected by buses.

Data/program storage 112 is coupled to processor 106. Data/program storage 112 can include various storage media, for example, magnetic storage (e.g., hard disks, floppy disks, tape, etc.), optical storage (e.g., compact disk, digital video disk, etc.), or semiconductor memory (e.g., static or dynamic random-access-memory ("SRAM" or "DRAM"), read-only-memory ("ROM"), FLASH memory, magnetic random access memory ("MRAM"), etc.).

The system 100 includes software programming stored in storage 112 that when executed by the processor 106 provide recognition of a touch input contacts that initiate adjustment of audio settings. On recognition of touch contacts, embodiments further recognize adjustment of audio settings that can include adjustments of a sound frequency of an audio signal of an audio device, adjustment of a volume level of audio devices, and volume balance level of audio devices. Thus, embodiments advantageously provide a simple and consistent method of adjusting audio settings of audio devices. Some embodiments of system 100 include audio adjustment program 118 which can be executed by processor to adjust audio settings such as adjust sound frequency of an audio signal of an audio device, adjust volume level of audio devices, and adjust volume balance level of audio devices.

Figure 3:
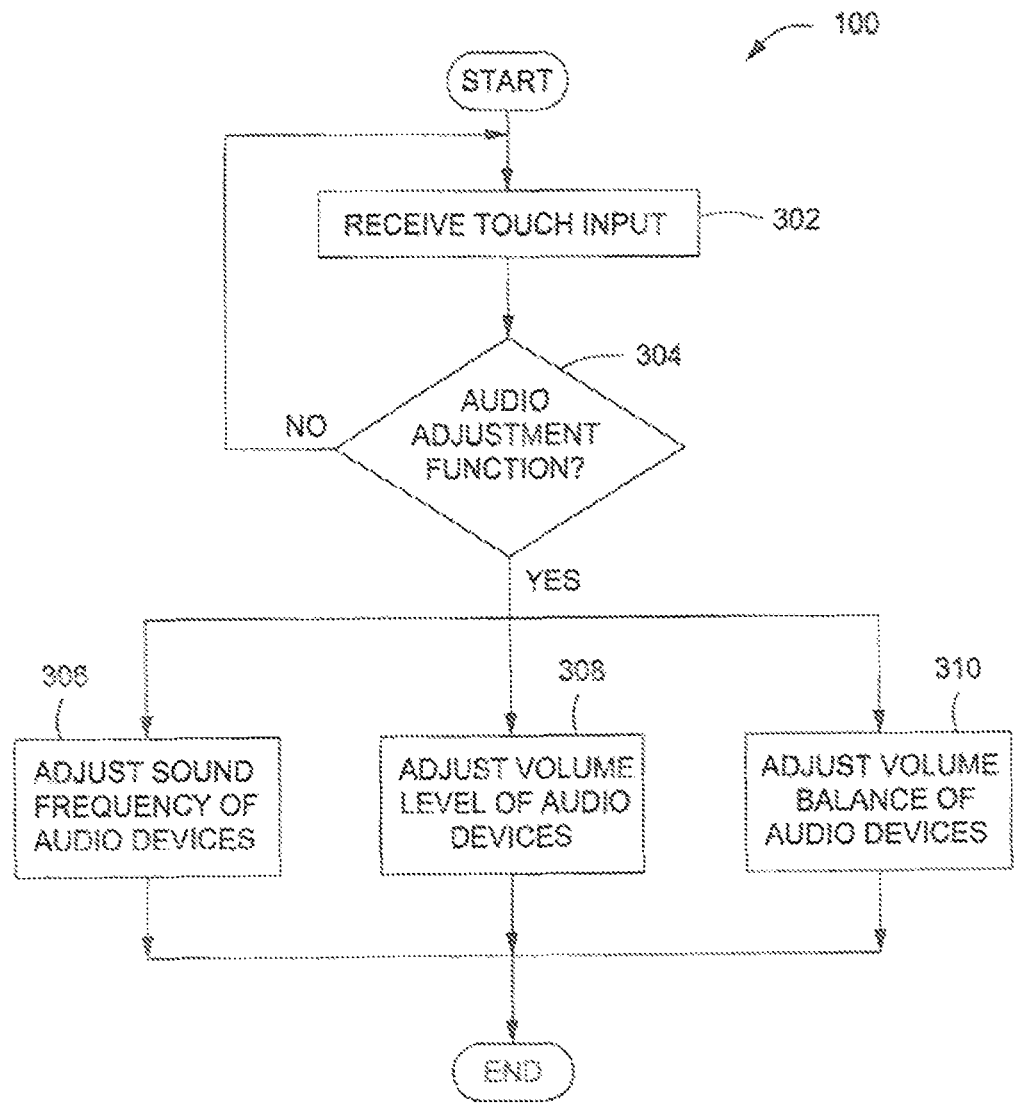
FIG. 3 is a flow chart showing a method of performing touch input based adjustment of audio device settings, constructed in accordance with at least some illustrative embodiments.

FIG. 3 shows a flow diagram for a method for implementing touch input based audio adjustment setting applicable to a variety of applications in accordance with various embodiments. Though depicted sequentially as a matter of convenience, at least some of the actions shown can be performed in a different order and/or performed in parallel. Additionally, some embodiments may perform only some of the actions shown.

In block 302, touch input device 104 detects user touch contacts with the device. The contacts are converted to electrical signals 208, and the electrical signals are provided to processor 106. The processor 106 executes instructions of audio adjustment program 118 to determine whether the signals 208 represent contacts indicating that the user desires to adjust audio settings. In some embodiments, the user can touch the input device 104 with two fingers simultaneously (i.e., make contact with the input device at two, points within a predetermined proximity of one another) to indicate a desire to adjust audio settings. However, embodiments are not limited to any particular contact pattern or sequence to initiate adjustment of audio settings.

If, in block 304, the processor 106 executing audio adjustment program 118 determines that audio setting adjustment is desired, then processing continues to one of blocks 306, 308, 310 for further evaluation and processing, otherwise processing continues in block 302.

In at least some embodiments, if processor executing audio adjustment program 118 determines that the contacts signify a desire of the user to adjust sound frequency, then processing continues to block 306. In one embodiment, contact movement described in FIG. 4 can be used to determine a users desire to adjust sound frequency of an audio signal for audio devices.

In at least some embodiments, if processor executing audio adjustment program 118 determines that the contacts represent a desire of the user to adjust volume level of audio devices, then processing continues to block 308. In one embodiment, contact movement described in FIG. 5 can be used to determine a users desire to adjust volume level of audio devices.

In at least some embodiments, if audio, adjustment program 118 determines that the contacts signify a desire of the user to adjust volume balance, then processing continues to block 310. In one embodiment contact movement described in FIG. 6 can be used to determine a users desire to adjust volume balance of audio devices.

Figure 4:
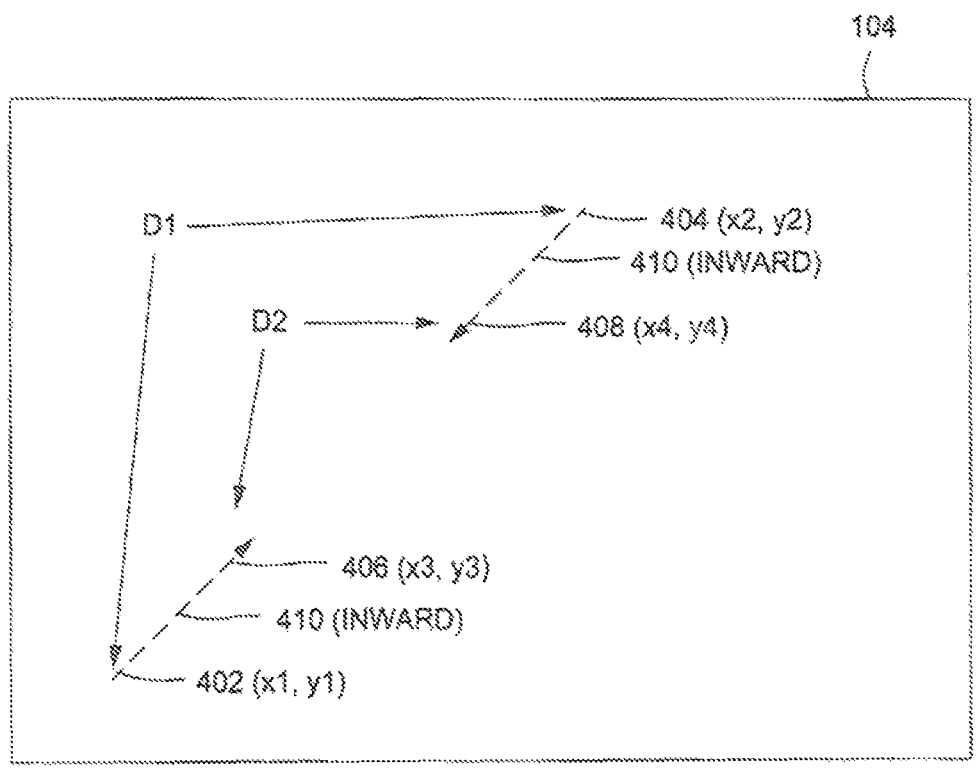
FIG. 4 show a touch input based sound frequency adjustment of an audio signal as used with the system of FIG. 1, constructed in accordance with at least some illustrative embodiments.

FIG. 4 shows an exemplary touch input based sound frequency adjustment of audio device setting as used with the system 100 of FIG. 1, constructed in accordance with at least some illustrative embodiments. In FIG. 4, the user desires to adjust a sound frequency of an audio signal for at least one audio device 114. To adjust the sound frequency, in one embodiment, the user contacts the input device 104 at a first beginning touch point 402 (with coordinates x1, y1) with one finger and a second beginning touch point 404 (with coordinates x2, y2) with a second finger, and maintains contact at these points for a predetermined time interval (e.g., 1-1.5 seconds). The input device 104 detects the contacts and provides signals 208 representing the contacts to the processor 106. Based on the signals 208, the processor 106 executes audio adjustment program 118 and determines that the user desires to adjust the sound frequency of an audio signal for an audio device. The program applies the following equation to determine the location of the first touch points:

$$\text{Distance}(D1) = ((x1-x2)*(y1-y2))/2$$

The user maintains contact with the input device 104, and moves his fingers inward toward each other as depicted by arrows 410. The selection of the particular audio frequency is complete when the user discontinues contact with the input device 104 as depicted by first ending touch point 406 and second ending touch point 408. The program use the following equation to determine the location of the second touch points:

$$\text{Distance}(D2) = ((x3-x4)*(y3-y4))/2$$

The input device provides signals 208 to processor 106 that represent the movement of the users point of contact on the input device 104 between the first distance D1 and the second distance D2. The following equation is applied to determine the magnitude of the difference in distance or delta between the first distance D1 and the second distance D2:

$$\text{Distance movement delta value }(DD) = (|D1|/|D2|)$$

The program then applies the delta distance DD value to adjust the frequency of an audio signal. In one embodiment, the value of D1>D2 when the two points move toward to each other (inward). In one embodiment, the value of D1<D2 when the two points move away from each other (outward). In one embodiment, the signal is a 2 Hz sine wave cycle having a frequency that is adjusted based on the delta distance value as follows:

$$y = \text{Sin}(2*x*DD)$$

Here, 'x' is an input representing time and is an output representing the output of the sine wave signal. In one embodiment, the program 118 can include instructions to store this audio setting for subsequent use by the user. For example, this audio setting can be used for generating a sound representing an error condition as part of an application program such as a word processing program. In other embodiments, this contact pattern can be used to control or adjust other functions of the computing device. The embodiment of FIG. 4 shows that moving a user's fingers inward (arrows 410) results in a reduced distance value which is used by the program to reduce the frequency value resulting in a lower sound wave tone. In other words, the value D1>D2 when two points move toward each other (inward). In other embodiments, touching the screen at two points and moving outward (opposite to arrows 410) may result in an increase distance value which can be used by the program to increase the frequency resulting in a higher sound wave tone. In other words, the value D1<D2 when two points move away from each other (outward).

In some embodiments, the techniques described above in the context of FIG. 4 to adjust the sound frequency of an audio device can be employed to perform volume level adjustment audio device setting with the system 100 of FIG. 1. In one embodiment, to illustrate, it will be assumed that audio device 114 is configured as a front speaker located toward the front of system 100 and audio device 116 is configured as a rear speaker located toward the rear of system 100. The embodiment of FIG. 4 shows moving a user's fingers inward (arrows 410) resulting in a reduced distance value which can be used, by the program to decrease the volume level of the front speaker (device 114) and increase the volume level of the rear speaker (device 116). In other embodiments, touching the screen at two points and moving outward (opposite to arrows 410) results in an increase distance value which can be used by the program to increase the volume level of the front speaker (device 114) and decrease the volume level of the rear speaker (device 116). A rear and front speaker have been shown for illustrative purpose. It should be understood that a greater or smaller number of speakers can be implemented with these techniques. For example, system 100 can include a single speaker and the techniques of FIG. 4 can be used to adjust the volume level of the single speaker.

In some embodiments, the techniques described above in the context of FIG. 4 to adjust the sound frequency of an audio device can be employed to adjust other components of a computing device. For example, in one embodiment, these techniques can be employed to adjust sound equalizer control settings, such as bass or treble, of an audio device. In another embodiment, the techniques can be implemented to adjust noise reduction control of an audio device such as reducing the noise frequency from a voice wave. In other embodiments, these techniques can be used to adjust graphics control components of a computing device, such as LCD brightness control, graphics data color contrast control and graphics data brightness control. In yet other embodiments, these techniques can be used to adjust processor settings of a computing device such as processor speed control for a virtual machine and processor speed control for system power management. In another embodiment, these techniques can be used to adjust input/output devices of the computing device such as mouse control.

Figure 5:
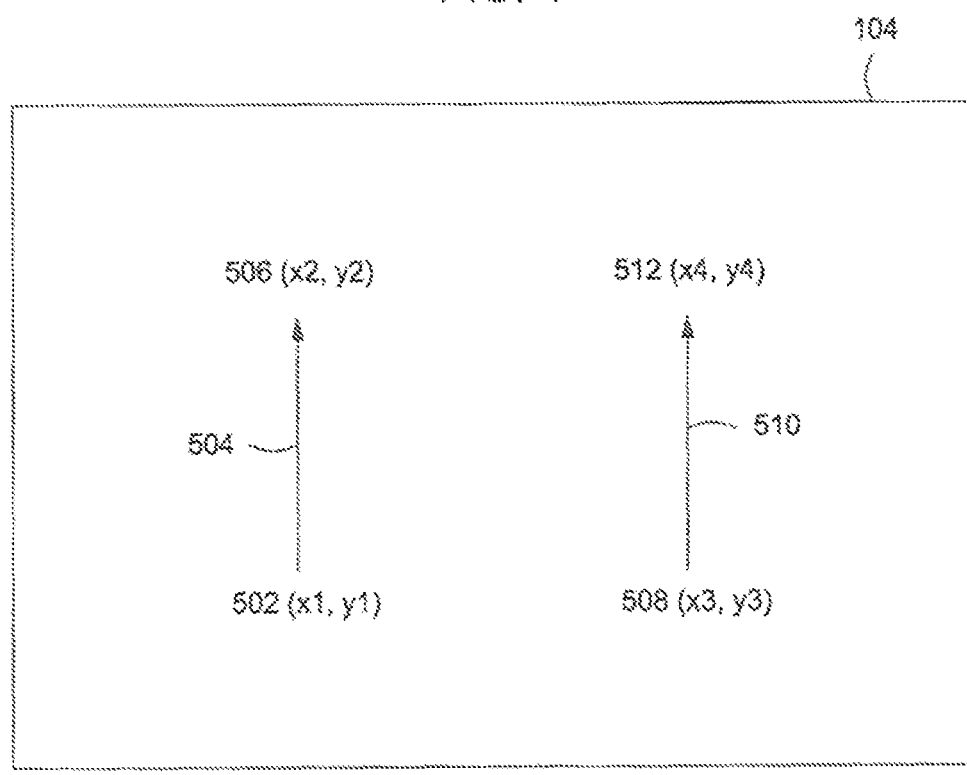
FIG. 5 shows a touch input based volume level adjustment as used with the system of FIG. 1, constructed in accordance with at least some illustrative embodiments.

FIG. 5 shows an exemplary touch input based volume level adjustment audio device setting as used with the system 100 of FIG. 1, constructed in accordance with at least some illustrative embodiments. In FIG. 5, the user desires to adjust the audio volume level by making continuous contact between two beginning touch point contacts and two ending touch point contacts. In one embodiment, to illustrate, it will be assumed that audio device 114 is configured as a front speaker located toward the front of system 100 and audio device 116 is configured as a rear speaker located toward the rear of system 100. To adjust the volume, in one embodiment, the user contacts the input device 104 at a first beginning touch point 502 (with coordinates x1, y1) with one finger and a second beginning touch point 508 (with coordinates x3, y3) with a second finger and maintains contact at these points for a predetermined time interval (e.g., 1-1.5 seconds). The input device 104 detects the contacts and provides signals 208 representing the contacts to processor 106. Based on signals 208, processor 106 executes audio adjustment program 118 and determines that the user desires to adjust the audio volume level of audio devices. The program 118 stores the location of the first touch points for subsequent processing, as explained below.

The user maintains contact with the input device 104, and moves his fingers in the upward direction depicted by arrows 504, 510. In one embodiment, the user moves the finger associated with first point 502 along path 504 and the finger associated with the second point 508 along path 510. The selection of the particular volume level is complete when the user discontinues contact with input device 104 as depicted by first ending touch point 506 and second ending touch point 512. The input device 104 provides signals 208 to processor 106 that represent the movement of the user's points of contact on the input device 104 along first path 504 (distance between touch points 502 and 506) and second path 510 (distance between touch points 508 and 512). The following equation is applied to determine the difference in distance or delta between touch points 502, 506 along path 504:

$$\text{Touch point 1 delta value }(TPY1D) = (y2-y1)$$

The following equation is applied to determine the difference in distance or delta between touch points 508, 512 along path 510:

$$\text{Touch point 2 delta value }(TPY2D) = (y4-y3)$$

As described above, audio device 114 is configured as front speaker and audio device 116 is configured as rear speaker. In this example, if both TPY1D and TPY2D are positive values, then the processor increases the volume level of the front speaker and decreases the volume level of the rear speaker. In one embodiment, processor 106 can execute instructions to store these audio settings for subsequent use by system 100. In the embodiment shown in FIG. 5, user contact movement was in an upward direction (arrows 510) to provide a particular adjustment. In another embodiment, user contact movement can take place in the opposite direction (downward) to provide the opposite adjustment. For example, if both TPY1D and TPY2D are negative values, then the processor increases the volume level of the rear speaker and decreases the volume level of the front speaker.

Figure 6:
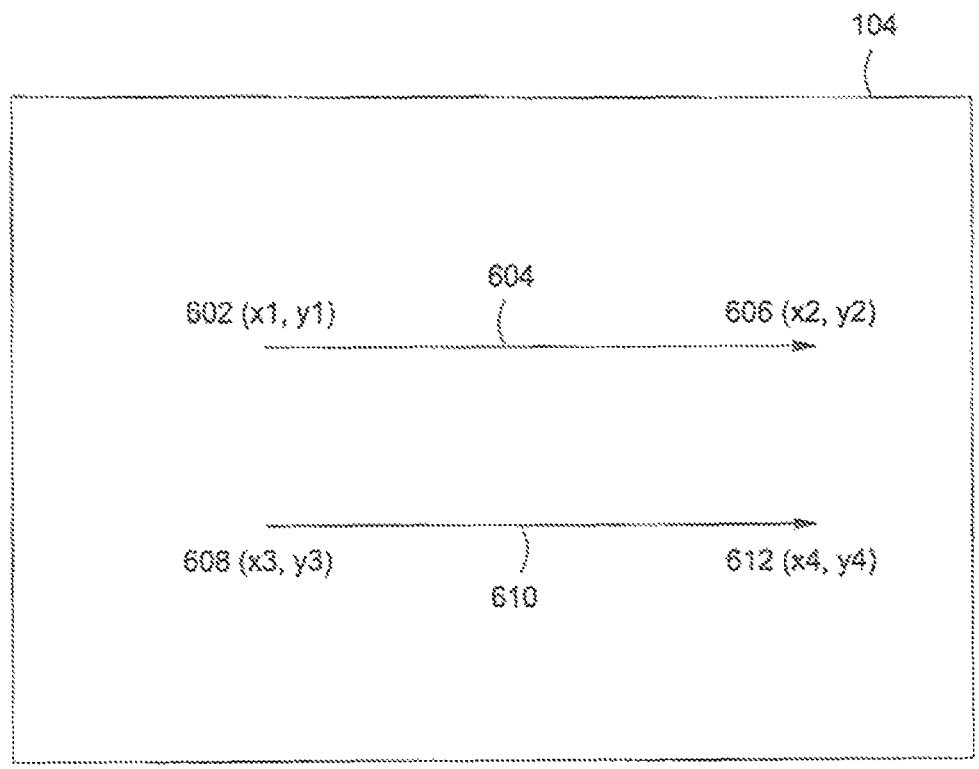
FIG. 6 shows a touch input based volume balance level adjustment as used with the system of FIG. 1, constructed in accordance with at least some illustrative embodiments.

FIG. 6 shows a touch input based volume balance adjustment as used with the system 100 of FIG. 1, constructed in accordance with at least some illustrative embodiments. In FIG. 6, the user desires to adjust the audio volume balance level of audio devices 114, 116 by making continuous contact between two beginning and two ending touch point contacts. In one embodiment, to illustrate, it will be assumed audio devices 114,116 are configured as a stereo system such that device 114 is configured as a left channel speaker located toward the left of system 100 and device 116 is configured as a right channel speaker located toward the right of system 100. To adjust the balance, in one embodiment, the user contacts input device 104 at a first beginning touch point 602 (with coordinates x1, y1) with one finger and a second beginning touch point 608 (with coordinates x3, y3) with a second finger and maintains contact at these points for a predetermined time interval (e.g., 1-1.5 seconds). The input device 104 detects the contacts and provides signals 208 representing the contacts to processor 106. Based on signals 208, processor 106 executes audio adjustment program 118 and determines that the user desires to adjust the audio volume balance level for an audio device. The program stores the location of the first touch points for subsequent processing, as explained below.

The user maintains contact with the input device 104, and moves his fingers in a horizontal manner toward the right as depicted by arrows 604, 610. For example, the first finger moves along path 604 and the second finger moves along path 610. The selection of the particular volume balance level is complete when the user discontinues contact with input device 104 as depicted by first ending touch point 606 and second ending touch point 612. The input device 104 provides signals 208 to the processor 106 that represent the movement of the user's point of contact on input device 104 along paths 604 and 610. The following equation is applied to determine the difference in distance or delta between the first touch points 602, 606 along path 604:

Touch point 1 delta value $(TPX1D) = (x2-x1)$

The following equation is applied to determine the difference in distance or delta between the second touch points 608, 612 along path 610:

Touch point 2 delta value $(TPX2D) = (x4-x3)$

As explained above, in one embodiment, audio devices 114,116 are configured as a stereo system such that device 114 is configured as a left channel speaker and device 116 is configured as a right channel speaker. If both TPX1D and TPX2D are positive values, then the processor adjusts the stereo speaker volume balance such that the volume of the right speaker (audio device 116) is increased and the volume of the left speaker (audio device 114) is decreased. In one embodiment, processor 106 can execute instructions to store these audio settings for subsequent use by system 100. In the embodiment shown in FIG. 6, user contact movement was toward the right (arrows 604, 610) to provide a particular adjustment. In another embodiment, user contact movement can take place in the opposite direction (left) to provide the opposite adjustment. For example, if both TPX1D and TPXY2D are negative values, then the processor adjusts the stereo speaker volume balance such that the volume of the left speaker (audio device 114) is increased and the volume of the right speaker (audio device 116) is decreased.

In some embodiments, the touch input based adjustment of audio device setting of the present application may provide various advantages. Conventional techniques for computing devices often include graphical user interfaces to allow users the ability to make changes to the audio settings. Typically, a user needs to search to find such interfaces, resulting in inefficient use of time. In addition, developing such interfaces often require programming and memory resources which may increase the cost of manufacture. Other conventional techniques often include using physical buttons on the computing device which may also increase the cost of manufacture. In one embodiment of the present application, using a touch input device reduces the need to provide a separate graphical user interface to adjust audio settings which helps reduce the requirement for programming and memory resources. In addition, no additional physical buttons or input devices are necessary thereby helping reduce manufacturing costs.

The illustrative embodiments may be implemented in software and can be adapted to run on different platforms and operating systems. In particular, functions for implementing the audio adjustment program 118, for example, may be provided by an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semi-conductor system, apparatus, device, or propagation medium.

The above discussion is meant to be illustrative of the principles and various embodiments of the present invention. Numerous variations and modifications will become apparent to those skilled in the art once the above disclosure is fully appreciated. For example although the illustrative embodiments of the present disclosure are shown and described within the context of touch based computer, other types of computer systems are also equally well suited for use with touch input device 104. It is intended that the following claims be interpreted to embrace all such variations and modifications.

What is claimed is:

1. A computing device comprising:
a touch input device to detect multiple touch point contacts; and
a processor coupled to the touch input device and to execute software instructions that process the multiple touch point contacts, and based on the multiple touch point contacts, adjust at least one audio setting of a plurality of audio output devices by increasing a first value of the audio setting for at least one audio output device of the plurality of audio output devices and decreasing a second value of the audio setting for at least one other audio output device of the plurality of audio output devices.

2. The computing device of claim 1, wherein the multiple touch point contacts comprise a first touch contact comprising continuous movement from a beginning touch point to an ending touch point, a second touch contact comprising continuous movement from a beginning touch point to an ending touch point.

3. The computing device of claim 2, wherein the adjustment is based on a first distance between the beginning touch point and the ending touch point of the first touch contact and a second distance, between the beginning touch point and the ending touch point of the second touch contact.

4. The computing device of claim 1, wherein the multiple touch point contacts comprise a touch contact comprising continuous movement from a beginning touch point to an ending touch point.

5. The computing device of claim 4, wherein the adjustment is based on a distance between the beginning touch point and the ending touch point.

6. The computing device of claim 1, wherein adjustment of the at least one audio setting comprises adjusting a sound frequency of an audio signal for the plurality of audio output devices.

7. The computing device of claim 1, wherein the adjustment of the at least one audio setting comprises adjustment of a volume level of a first audio output device and a second audio output device of the plurality audio output devices.

8. The computing device of claim 1, wherein the adjustment of the at least one audio setting comprises adjustment of a volume balance of a first audio output device and a second audio output device of the plurality audio output devices.

9. A method comprising:
detecting multiple touch point contacts;
processing the multiple touch point contacts; and
adjusting at least one audio setting of a plurality of audio output devices, based on the multiple touch point by increasing a first value of the audio setting for at least one audio output device of the plurality of audio output devices and decreasing a second value of the audio setting for at least one other audio output device of the plurality of audio output devices.

10. The method of claim 9, wherein the multiple touch point contacts comprise a first touch contact comprising continuous movement from a beginning touch point to an ending touch point, a second touch contact comprising continuous movement from a beginning touch point to an ending touch point.

11. The method of claim 10, wherein adjusting is based on a first distance between the beginning touch point and the ending touch point of the first touch contact and a second distance between the beginning touch point and the ending touch point of the second touch contact.

12. The method of claim 9, wherein the multiple touch point contacts comprise a first touch contact comprising continuous movement from a beginning touch point to an ending touch point.

13. The method of claim 12, wherein adjusting is based on a distance between the beginning touch point and the ending touch point.

14. The method of claim 9, wherein adjusting the at least one audio setting comprises adjusting a sound frequency of an audio signal for the plurality of audio output devices.

15. The method of claim 9, wherein adjusting the at least one audio setting comprises adjusting a volume level of a first audio output device and a second audio output device of the plurality audio output devices.

16. The method of claim 9, wherein adjusting the at least one audio setting comprises adjusting a volume balance level of a first audio output device and a second audio output device of the plurality audio output devices.

17. A non-transitory computer-readable medium having stored thereon an instruction set to be executed, the instruction set, when executed by a processor, causes the processor to:
detect multiple touch point contacts;
process the multiple touch point contacts; and
adjust at least one audio setting of a plurality of audio output devices, based on the multiple touch point contacts by increasing a first value of the audio setting for at least one audio output device of the plurality of audio output devices and decreasing a second value of the audio setting for at least one other audio output device of the plurality of audio output devices.

18. The computer-readable medium of claim 17, wherein the instruction set, when executed by the process, causes the processor to adjust a sound frequency of an audio signal for the plurality of audio output devices.

19. The computer-readable medium of claim 17, wherein the instruction set, when executed by the process, causes the processor adjust a volume level of a first audio output device and a second audio output device of the plurality audio output devices.

20. The computer-readable medium of claim 17, wherein the instruction set, when executed by the process, causes the processor to adjust a volume balance level of a first audio output device and a second audio output device of the plurality audio output devices.

* * * * *